United States Patent
Nishikawa et al.

(10) Patent No.: US 7,094,481 B2
(45) Date of Patent: Aug. 22, 2006

(54) MASTER INFORMATION CARRIER FOR MAGNETIC TRANSFER AND MAGNETIC TRANSFER METHOD

(75) Inventors: Masakazu Nishikawa, Kanagawa-ken (JP); Kazuhiro Niitsuma, Kanagawa-ken (JP); Tadashi Yasunaga, Kanagawa-ken (JP); Toshihiro Usa, Kanagawa-ken (JP); Kazunori Komatsu, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/958,327

(22) Filed: Oct. 6, 2004

(65) Prior Publication Data
US 2005/0041314 A1 Feb. 24, 2005

Related U.S. Application Data

(62) Division of application No. 10/304,998, filed on Nov. 27, 2002, now Pat. No. 6,816,327.

(30) Foreign Application Priority Data
Nov. 28, 2001 (JP) .............................. 2001/362550

(51) Int. Cl.
G11B 5/64 (2006.01)
G11B 5/86 (2006.01)

(52) U.S. Cl. ........................................ 428/826; 360/17

(58) Field of Classification Search .................... None
See application file for complete search history.

(56) References Cited

U.S. PATENT DOCUMENTS

| 6,347,016 | B1 | 2/2002 | Ishida et al. |
| 6,606,209 | B1 | 8/2003 | Ishida et al. |
| 6,816,327 | B1 * | 11/2004 | Nishikawa et al. ........... 360/17 |
| 6,887,593 | B1 * | 5/2005 | Sugita et al. ................. 360/15 |
| 6,911,270 | B1 * | 6/2005 | Nishikawa et al. ........... 360/16 |
| 2001/0028964 | A1 | 10/2001 | Nagano et al. |
| 2002/0054442 | A1 | 5/2002 | Nishikawa |

FOREIGN PATENT DOCUMENTS

| JP | 63-183623 | 7/1988 |
| JP | 10-269566 | 10/1988 |
| JP | 10-40544 | 2/1998 |

\* cited by examiner

*Primary Examiner*—Wayne Young
*Assistant Examiner*—Glenda P. Rodriguez
(74) *Attorney, Agent, or Firm*—Sughrue Mion, PLLC (57) ABSTRACT

A master information carrier for magnetic transfer to an in-plane magnetic recording medium includes a base sheet having an irregularity pattern representing information to be transferred to an in-plane magnetic recording medium and a magnetic layer formed along the irregularity pattern. The thickness $da1$ of the magnetic layer on the upper surface of a protruding portion of the irregularity pattern and the thickness $da2$ of the magnetic layer on each of the side surfaces of the protruding portion satisfy the following condition, $$0.05 < da2/da1 \leq 1.3.$$

10 Claims, 6 Drawing Sheets

MASTER INFORMATION CARRIER FOR MAGNETIC TRANSFER AND MAGNETIC TRANSFER METHOD

This is a divisional of application Ser. No. 10/304,998 filed Nov. 27, 2002 now U.S. Pat. No. 6,816,327.

BACKGROUND OF THE INVENTION

1. Field of the Invention

This invention relates to a master information carrier carrying thereon an irregularity pattern representing the information to be transferred to a magnetic medium and a magnetic transfer method.

2. Description of the Related Art

With an increase in information quantity, there is a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc, a zip (Iomega) and the like. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At the present, such preformat recording is performed by the use of a specialized servo recording apparatus (a servo track writer). However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication Nos. 63(1988)-183623, 10(1998)-40544 and 10(1998)-269566, a magnetic transfer method in which a pattern which is formed on a master information carrier and represents servo information is copied to a magnetic recording medium (a slave medium) by magnetic transfer.

In the magnetic transfer, the magnetization pattern representing the information (e.g., servo information) carried by a master information carrier is magnetically transferred from the master information carrier to a slave medium by applying a transfer magnetic field to the slave medium and the master information in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

However, the master information carrier employed in the magnetic transfer disclosed in above identified Japanese Unexamined Patent Publications comprises a base sheet having on the surface thereof an irregularity pattern representing the information to be transferred and a magnetic layer formed at least on the surface of the protruding portions of the base sheet and since the magnetic transfer is carried out with the master information carrier and the slave medium held in close contact with each other, the magnetic layer can be partly lost or peeled off the pattern while the master information carrier is repeatedly brought into contact with and moved away from a number of slave media.

Removal of the magnetic layer from the master information carrier deteriorates contact between the master information carrier and the slave medium, which can result in deterioration in quality of the transferred signal. Further when the magnetic layer is peeled off the master information carrier over a wide area thereof, it is necessary to change the maser information carrier. The master information carrier is expensive and how many slave media can be made per one master information carrier largely governs the production cost of a magnetic recording medium.

We observed master information carriers from which the magnetic layer had been peeled and found that the magnetic layer was most peeled off the master information carrier at edges of flat top surfaces of the protruding portions of the irregularity pattern on the master information carrier and that as the pressure under which the master information carrier and the slave medium were in contact with each other increased, the magnetic layer was peeled off the master information carrier at a higher frequency. That is, it was presumed that dynamic structural weakness of the master information carrier caused the magnetic layer to be peeled off. The dynamic structural strength of the master information carrier is governed by, for instance, the thickness of the magnetic layer and the bonding strength between the base sheet and the magnetic layer. Our further investigation has revealed that edges of flat top surfaces of the protruding portions of the irregularity pattern on the master information carrier were often cut where the side faces of the protruding portions were covered with a very thin magnetic layer or with no magnetic layer, that is, the thickness distribution of the magnetic layer generated a structural strength distribution, and stress was concentrated on the portions where structural strength was weak to generate peeling of the magnetic layer.

Further, our investigation has revealed that the thickness of the magnetic layer on the side faces of the protruding portions of the irregularity pattern on the master information carrier largely affects the quality of the signal transferred to the slave media.

SUMMARY OF THE INVENTION

In view of the foregoing observations and description, the primary object of the present invention is to provide an improved master information carrier for magnetic transfer which has an improved durability and can transfer information to slave media so that an excellent reproduction signal can be obtained in the slave media.

Another object of the present invention is to provide a magnetic transfer method using the improved master information carrier.

In accordance with a first aspect of the present invention, there is provided a master information carrier for magnetic transfer to an in-plane magnetic recording medium comprising a base sheet having an irregularity pattern representing information to be transferred to an in-plane magnetic recording medium and a magnetic layer formed along the irregularity pattern, wherein the improvement comprises that the thickness da1 of the magnetic layer on the upper surface of a protruding portion of the irregularity pattern and the thickness da2 of the magnetic layer on each of the side surfaces of the protruding portion satisfy the following condition, $0.05 < da2/da1 \leq 1.3$.

In accordance with a second aspect of the present invention, there is provided a master information carrier for magnetic transfer to a perpendicular magnetic recording medium comprising a base sheet having an irregularity pattern representing information to be transferred to a perpendicular magnetic recording medium and a magnetic layer formed along the irregularity pattern, wherein the improvement comprises that the thickness db1 of the magnetic layer on the upper surface of a protruding portion of the irregularity pattern and the thickness db2 of the magnetic layer on each of the side surfaces of the protruding portion satisfy the following condition, $0.1 < db2/db1 \leq 0.5$.

In the present invention, the information to be transferred to an in-plane magnetic recording medium or a perpendicular magnetic recording medium generally includes servo information, and it is preferred that the magnetic layer be a soft magnetic layer or a semi-hard magnetic layer weak in coercive force.

According to our investigation, in the master information carrier for magnetically transferring information to in-plane magnetic recording media, peeling of the magnetic layer often takes place when da2/da1 is not larger than 0.05 and durability of the master information carrier deteriorates. As the thickness da2 of the magnetic layer on each of the side surfaces of the protruding portion increases, peeling of the magnetic layer becomes less and durability of the master information carrier remarkably increases. However, when da2/da1 is larger than 1.3, the magnetic flux which should enter the slave medium from the magnetic layer on the upper surface of the protruding portion upon application of the transfer magnetic field becomes apt to be drawn in the magnetic layer on the side surface of the protruding portion and the intensity of the transfer magnetic field deteriorates, which results in deterioration of quality of signals reproduced from the slave medium after the magnetic transfer.

Accordingly, in the case of the master information carrier for magnetically transferring information to in-plane magnetic recording media, when $0.05 < da2/da1 \leq 1.3$, durability of the master information carrier is improved and an optimal magnetization pattern can be formed on the slave media so that high-quality reproduction signals can be obtained. When durability of the master information carrier is improved, a larger number of preformatted magnetic recording media can be obtained from one master information carrier, whereby preformatted magnetic recording media can be less expensive.

In the case of the master information carrier for magnetically transferring information to perpendicular magnetic recording media, durability of the master information carrier can be improved when db2/db1>0.1 as in the master information carrier for the in-plane magnetic recording media. However, in the perpendicular recording, the intensity of the magnetic field at magnetization inversion portions on the slave medium opposed to the protruding portions of the irregularity pattern on the master information carrier can be enhanced by concentrating magnetic fluxes on the magnetic layer on the side surface of the protruding portions, and our investigation has revealed that when db2/db1<0.1, the transfer magnetic field intensity cannot be sufficient to obtain high-quality reproduction signals. However when db2/db1>0.5, the magnetic flux densities at the protruding portions become too small to obtain high-quality reproduction signals.

Accordingly, in the case of the master information carrier for magnetically transferring information to perpendicular magnetic recording media, when $0.1 < db2/db1 \leq 0.5$, durability of the master information carrier is improved and an optimal magnetization pattern can be formed on the slave media so that high-quality reproduction signals can be obtained. When durability of the master information carrier is improved, a larger number of preformatted magnetic recording media can be obtained from one master information carrier, whereby preformatted magnetic recording media can be less expensive.

In accordance with a third aspect of the present invention, there is provided a magnetic transfer method for magnetically transferring information carried by a master information carrier, comprising a base sheet having an irregularity pattern representing information to be transferred to an in-plane magnetic recording medium and a magnetic layer formed along the irregularity pattern, to an in-plane magnetic recording medium having a magnetic layer at least on one side thereof, the method comprising the steps of applying an initial DC magnetic field to the in-plane magnetic recording medium in a direction parallel to the tracks thereof so that the magnetic layer of the in-plane magnetic recording medium is magnetized in the direction and then applying a transfer magnetic field in a direction opposite to the direction of the initial DC magnetic field to the magnetic layer of the magnetic recording medium and the magnetic layer of the master information carrier with the magnetic layers held in a close contact with each other, wherein the improvement comprises that the thickness da1 of the magnetic layer on the upper surface of a protruding portion of the irregularity pattern on the master information carrier and the thickness da2 of the magnetic layer on each of the side surfaces of the protruding portion satisfy the following condition, $0.05 < da2/da1 \leq 1.3$.

In accordance with a fourth aspect of the present invention, there is provided a magnetic transfer method for magnetically transferring information carried by a master information carrier, comprising a base sheet having an irregularity pattern representing information to be transferred to a perpendicular magnetic recording medium and a magnetic layer formed along the irregularity pattern, to a perpendicular magnetic recording medium having a magnetic layer at least on one side thereof, the method comprising the steps of applying an initial DC magnetic field to the perpendicular magnetic recording medium in a direction perpendicular to the track plane thereof so that the magnetic layer of the perpendicular magnetic recording medium is magnetized in the direction and then applying a transfer magnetic field in a direction opposite to the direction of the initial DC magnetic field to the magnetic layer of the magnetic recording medium and the magnetic layer of the master information carrier with the magnetic layers held in a close contact with each other, wherein the improvement comprises that the thickness db1 of the magnetic layer on the upper surface of a protruding portion of the irregularity pattern on the master information carrier and the thickness db2 of the magnetic layer on each of the side surfaces of the protruding portion satisfy the following condition, $$0.1 < db2/db1 \leq 0.5.$$

Preferably the ratio of the thickness of the magnetic layer on each of the side surfaces of the protruding portion to the length S of the recess (the minimum of the lengths of the recesses between the tops of adjacent protruding portions of the irregularity pattern as measured in the direction of track) is larger than 0.05 and smaller than 0.4, that is, 0.05<the thickness of the magnetic layer on each of the side surfaces of the protruding portion/the length S of the recess<0.4.

When the ratio is not larger than 0.05, the amount of magnetic flux converged on the magnetic layer becomes insufficient to ensure sufficient signal quality, whereas when the ratio is not smaller than 0.4, the intensity of the transfer magnetic field generated between protruding portions becomes insufficient to ensure sufficient signal quality.

It is further preferred that the angle θ of inclination of each of the side surfaces of the protruding portion of the irregularity pattern (the angle between the protrusion side extension of the surface of the recess and the side surface) be not smaller than 30° and smaller than 80°. When the angle θ of inclination of the side surface is smaller than 30°, the transfer magnetic field generated from pattern edges is too dispersed to ensure sufficient signal quality, though the durability of the magnetic layer is greatly improved. Whereas, when the angle θ of inclination of the side surface is not smaller than 80°, pressure history in magnetic transfer is concentrated between the flat portion and the magnetic layer on the side surface of the protruding portion, which results in generation of crack and peeling of the magnetic layer, though no problem is involved in quality of the signal.

The magnetic layer of a slave medium may be formed of Co, Co alloy (e.g., CoPtCr, CoCr, CoPtCrTa, CoPtCrNbTa, CoCrB, CoNI, Co/Pd), Fe or Fe alloy (e.g., FeCo, FePt, FeCoNi).

It is preferred to clearly transfer the information that the magnetic layer be large in magnetic flux density and has magnetic anisotropy in the same direction as the slave medium (the direction of in-plane in the case where the slave medium is an in-plane magnetic recording medium whereas a perpendicular direction in the case where the slave medium is a perpendicular magnetic recording medium).

It is preferred that the magnetic layer be provided with a non-magnetic primer layer, for instance, of Cr, CrTi, CoCr, CrTa, CrMo, NiAl, Ru or Pd which gives a necessary magnetic anisotropy to the magnetic layer.

In the case where the slave medium is a perpendicular magnetic recording medium, a backing layer of a soft magnetic layer, for instance, of NiFe, CoCr, FeTaC or FeAlSi may be provided under the non-magnetic primer layer in order to stabilize the perpendicular magnetization of the magnetic layer and to improve the sensitivity upon recording and reproduction.

The thickness of the magnetic layer is preferably not smaller than 10 nm and not larger than 500 nm, and more preferably not smaller than 20 nm and not larger than 200 nm.

The thickness of the non-magnetic primer layer is preferably not smaller than 10 nm and not larger than 150 nm, and more preferably not smaller than 20 nm and not larger than 80 nm.

The thickness of the backing layer is preferably not smaller than 50 nm and not larger than 2000 nm, and more preferably not smaller than 80 nm and not larger than 400 nm.

DESCRIPTION OF THE PREFERRED EMBODIMENTS

Figure 1:
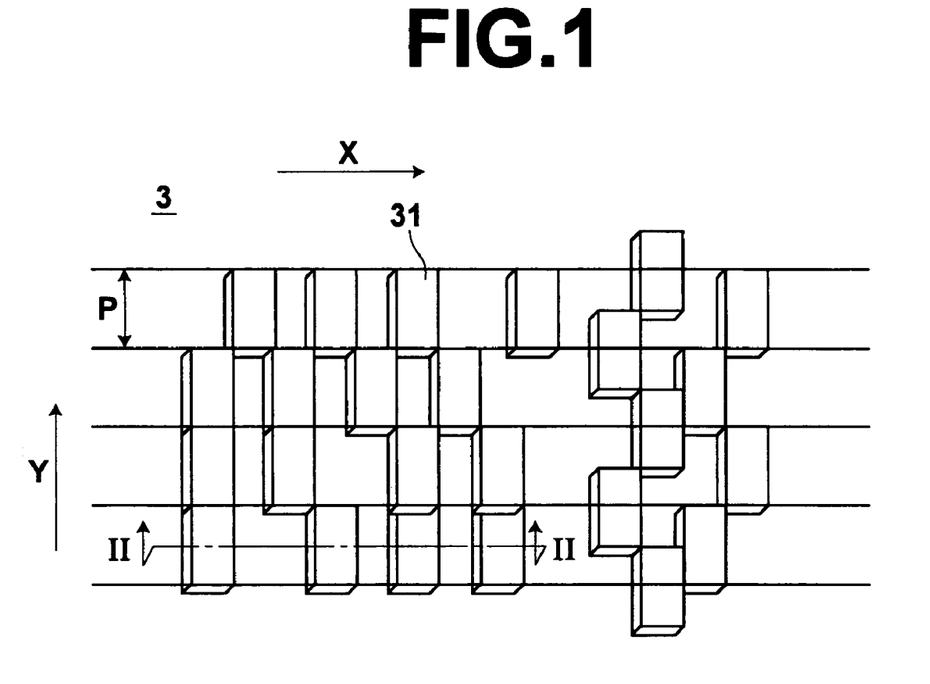
FIG. 1 is a plan view partly in a perspective view showing a master information carrier for magnetic transfer in accordance with a first embodiment of the present invention.

A master information carrier for preformatting in-plane magnetic recording media in accordance with a first embodiment of the present invention will be described first. In FIG. 1, a master information carrier 3 in accordance with a first embodiment of the present invention is like a disc in shape and comprises a base sheet 3a having a plurality of protruding portions 31 arranged in a pattern formed on the surface thereof (as a result the base sheet 3a has an irregularity pattern) and a soft magnetic layer 3b formed along the irregularity pattern. The irregularity pattern represents information to be transferred to magnetic recording media (slave media) and FIG. 1 shows a part of the irregularity pattern. The recessed portions (portions between protruding portions 31) need not be provided with magnetic layer. In FIG. 1, arrow X indicates the circumferential direction (the direction of track) and arrow Y indicates the radial direction.

Figure 2:
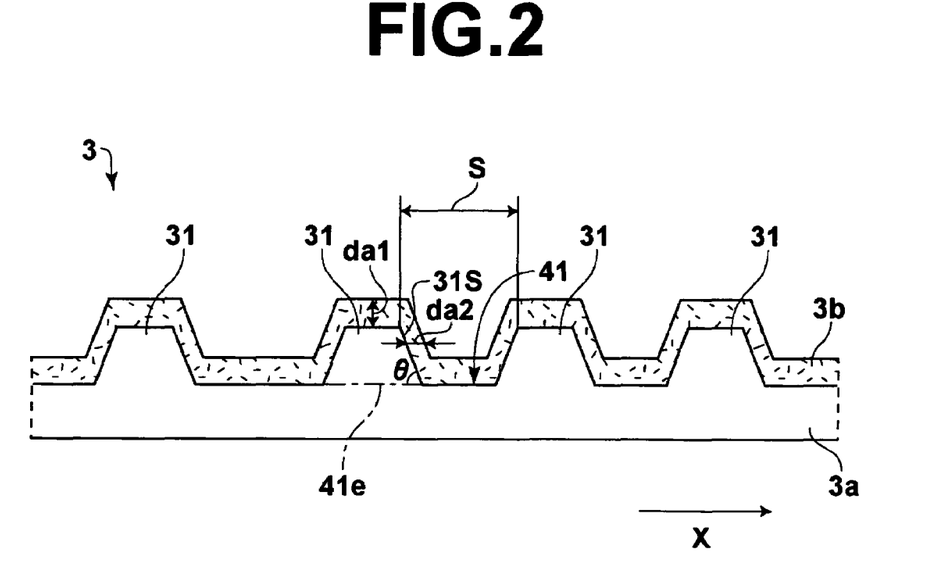
FIG. 2 is a fragmentary cross-sectional view taken along line II—II in FIG. 1.

In FIG. 2, which is a fragmentary cross-sectional view of a part of the master information carrier 3 including a protruding portion 31 taken along a line parallel to the direction X of track. In the master information carrier 3 of this embodiment, the soft magnetic layer 3b is formed so that the thickness da1 of the soft magnetic layer on the upper surface of the protruding portion 31 and the thickness da2 of the soft magnetic layer on the side surface of the protruding portion 31 satisfy the following condition, $$0.05 < da2/da1 < 1.3.$$

Though, in FIG. 2, the thickness da2 of the soft magnetic layer on the side surface of the protruding portion 31 is shown as the thickness of the soft magnetic layer on one of the side surfaces opposed to each other in the direction of the track, the thickness da2 of any one of the four side surfaces, i.e., the two side surfaces opposed to each other in the direction of the track and the two side surfaces opposed to each other in the radial direction, satisfies the condition above.

Further, in this embodiment, the angle θ of inclination of each of the side surfaces of the protruding portion 31 of the irregularity pattern (the angle between the protrusion side extension 41e of the surface 41 of the recess and the side surface 31s of the protruding portion 41) is not smaller than 30° and smaller than 80°. Further, in the embodiment, the ratio of the thickness da2 of the magnetic layer on each of the side surfaces 31s of the protruding portion 31 to the length S of the recess is larger than 0.05 and smaller than 0.4, that is, 0.05<da2/S<0.4. In this specification, "the length S of the recess" should be interpreted as "the minimum of the lengths of the recesses between the tops of adjacent protruding portions 31 of the irregularity pattern as measured in the direction of track.

The base sheet 3a of the master information carrier 3 may be formed of nickel, silicon, crystal, glass, aluminum, ceramics, synthetic resin or the like. The soft magnetic layers 3b may be formed of Co, Co alloy (e.g., CoNI, CoNiZr, CoNbTaZr), Fe, Fe alloy (e.g., FeCo, FeCoNi, FeNiMo, FeAlSi, FeAl, FeTaN), Ni or Ni alloy (e.g., NiFe). FeCo and FeCoNi are especially preferable as the material of the soft magnetic layer. The magnetic layer formed on the base sheet need not be a soft magnetic layer but may be a hard or semi-hard magnetic layer. However a soft magnetic layer or a semi-hard magnetic layer small in coercive force is preferred in that a more excellent magnetic transfer can be effected. Further, it is preferred that the magnetic layer formed on the base sheet be larger in saturation magnetization than the base sheet.

The irregularity pattern or the pattern of the protruding portions 31 can be formed, for instance, by the use of stamper method or photolithography.

A photo-resist layer is first formed on a smooth glass plate (or a smooth crystal plate), for instance, by spin coating, and a laser beam (or an electron beam) modulated according to the servo signal is projected onto the photo-resist layer while rotating the glass plate so that the photo-resist layer is exposed to the laser beam in a predetermined pattern, e.g., a pattern of servo signals each extending in a radial direction in one track. Thereafter the photo-resist layer is developed and the part exposed to the laser beam is removed with an irregularity pattern of the photo-resist left on the glass plate, thereby obtaining a matrix. Then the surface of the matrix is plated (electroforming), and a Ni base sheet having a positive irregularity pattern is formed on the matrix and separated from the matrix. The Ni base sheet as it is may be used as a master information carrier or may be used as a master information carrier after forming a magnetic layer (a soft magnetic layer in this particular embodiment) and a protective layer along the irregularity pattern as desired.

Otherwise, the matrix may be plated to form a second matrix and the second matrix may be plated to form a base sheet having a negative irregularity pattern. Further, a third matrix may be formed by plating the second matrix or pressing a resin syrup against the surface of the second matrix and curing the resin syrup, and a base sheet having a positive irregularity pattern may be formed by plating the third matrix.

Further, a matrix without photo-resist layer maybe first formed by etching the glass plate with an irregularity pattern of the photo-resist to make holes in the glass plate, and a base sheet may be formed by the use of the matrix in the manner described above.

The base sheet may be formed of metal such as Ni or Ni alloy as described above, and as the aforesaid plating for forming the metal base sheet, various metal film forming techniques such as electroless plating, electroforming, sputtering, or ion plating can be employed. The height of the protruding portion (the depth of the irregularity pattern) is preferably in the range of 50 to 800 nm and more preferably 80 to 600 nm. When the irregularity pattern represents sample servo signals, each of the protruding portions is rectangle having longer sides in a radial direction of the base sheet and shorter sides in a circumferential direction of the same. When the irregularity pattern represents sample servo signals, each of the protruding portions is preferably 0.05 to 20 μm in the longer sides and 0.05 to 5 μm in the shorter sides.

The soft magnetic layer 3b may be formed on the irregularity pattern by various vacuum film forming techniques or plating method such as vacuum deposition, sputtering, ion plating and the like of magnetic material. The thickness of the soft magnetic layer 3b is preferably 50 to 500 nm and more preferably 80 to 300 nm. As described above, the thickness da1 of the soft magnetic layer on the upper surface of the protruding portion 31 and the thickness da2 of the soft magnetic layer on each of the side surfaces of the protruding portion satisfy the following condition, 0.05<da2/da1≦1.3.

The relation between the thicknesses da1 and da2 can be effectively controlled by forming the soft magnetic layer by sputtering using a collimator and/or by controlling the mobility of sputtered particles on the substrate by controlling the sputtering power.

It is preferred that a protective film such as of DLC (diamond-like carbon) be provided on the soft magnetic layer on the upper surface of the protruding portion 31. A lubricant layer may be further provided on the protective film. A reinforcement layer such as a Si layer may be provided between the soft magnetic layer 3b and the protective film to enhance the contact therebetween. The lubricant layer suppresses deterioration in durability of the soft magnetic layer 3b, such as scores due to friction, which occurs in correcting for a shift generated when the soft magnetic layer 3b is brought into contact with the slave medium.

Magnetic transfer of information to a slave medium by the use of a master information carrier in accordance with the present invention will be described, hereinbelow.

Figure 3:
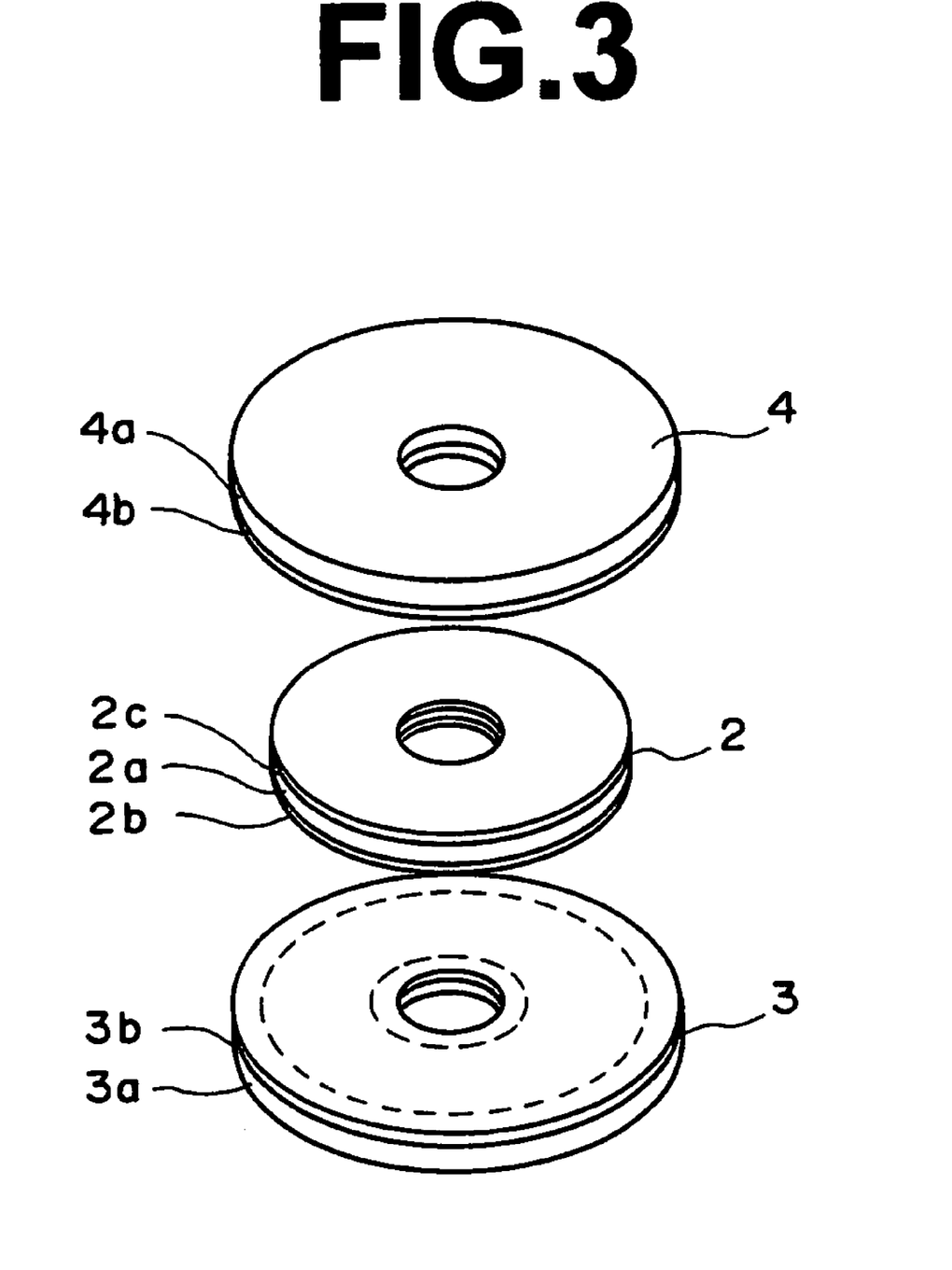
FIG. 3 is an exploded perspective view of a double-sided slave medium and a pair of master information carriers carrying thereon master information to be transferred to opposite sides of the slave medium.

As shown in FIG. 3, a pair of master information carriers 3 and 4 are disposed on opposite sides of a slave medium 2. The slave medium 2 may be, for instance, a hard disc or a flexible disc. In this particular embodiment, the slave medium 2 is provided with a pair of in-line recording magnetic layers 2b and 2c formed on lower and upper sides of a disc-shaped base sheet 2a though the slave medium 2 may be provided with a single recording layer.

Both the master information carriers 3 and 4 are in accordance with the present invention and respectively provided with irregularity patterns formed on the upper side of a base sheet 3a and the lower side of a base sheet 4a representing pieces of information to be transferred to the lower and upper magnetic layers 2b and 2c. Soft magnetic layers 3b and 4b are formed along the irregularities.

Though, in FIG. 3, the lower and upper master information carriers 3 and 4 and the slave medium 2 are away from each other, in the actual magnetic transfer process, the soft magnetic layer 3b of the lower master information carrier 3 is brought into contact with or to the vicinity of the lower magnetic layer 2b of the slave medium 2 and the soft magnetic layer 4b of the upper master information carrier 4 is brought into contact with or to the vicinity of the upper magnetic layer 2c of the slave medium 2.

Figure 4A:
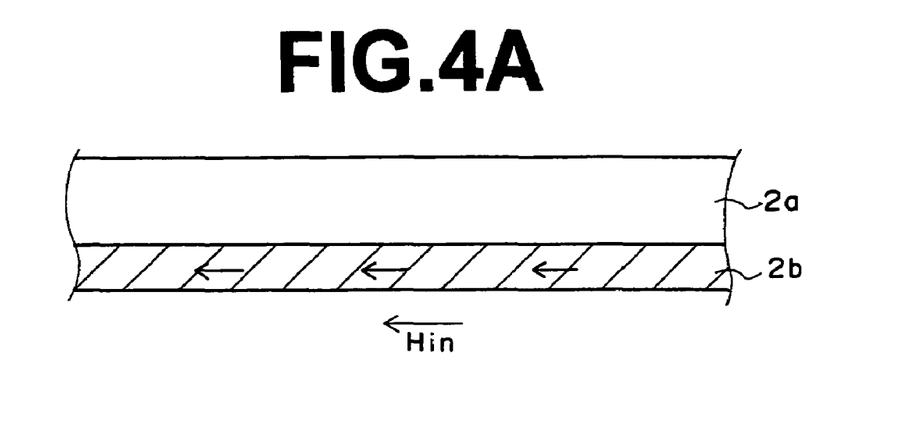
FIGS. 4A to 4C are views for illustrating basic steps of magnetic transfer to an in-plane magnetic medium.
Figure 4B:
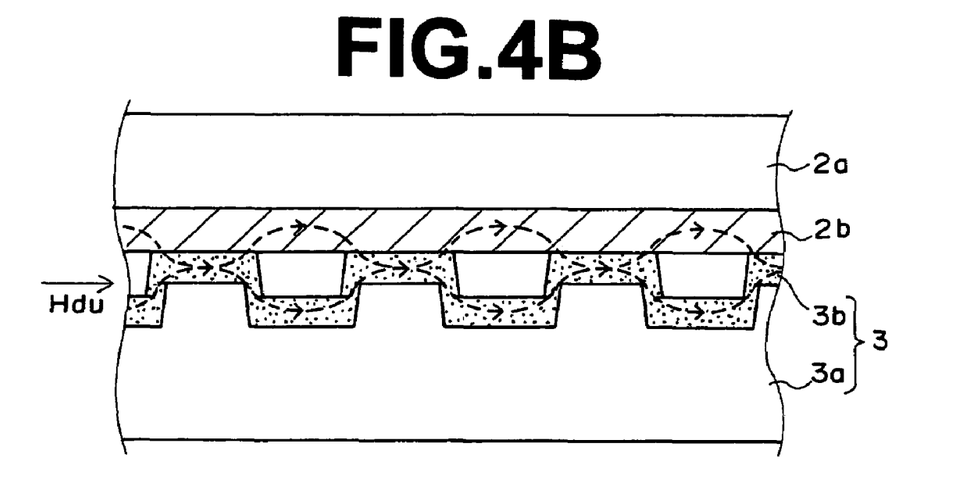
Figure 4C:
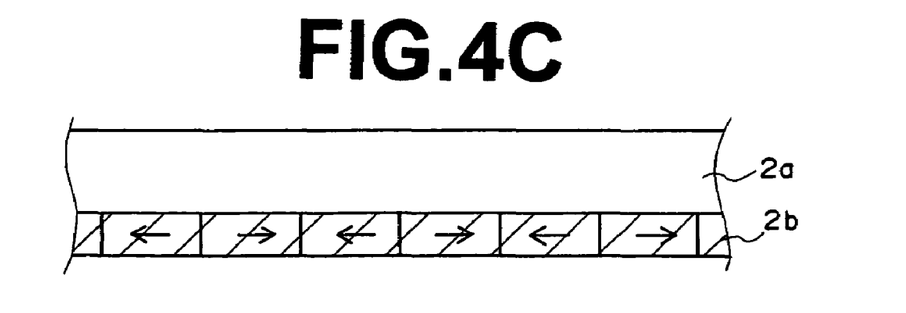

Basic steps of magnetic transfer to an in-plane magnetic recording medium will be described with reference to FIGS. 4A to 4C, hereinbelow. In FIGS. 4A to 4C, only the lower magnetic layer 2b is shown.

An initial DC magnetic field Hin is first applied to the slave medium 2 in one direction parallel to the recording tracks thereof, thereby magnetizing the magnetic layer 2b of the slave medium 2 as shown in FIG. 4A. Thereafter, the soft magnetic layer 3b of the lower master information carrier 3 is brought into close contact with the lower magnetic layer 2*b* of the slave medium 2. In this state, a transfer magnetic field Hdu is applied in the direction opposite to the initial DC magnetic field Hin as shown in FIG. 4B, thereby magnetically transferring the information on the master information carrier 3 to the lower magnetic layer 2*b* of the slave medium 2. As a result, information represented by the irregularity pattern on the master information carrier 3 is transferred to the lower magnetic layer 2*b* as shown in FIG. 4C. The information represented by the irregularity patterns on a pair of master information carriers may be transferred to opposite sides of the slave medium either simultaneously or in sequence.

In the case where the irregularity pattern representing information to be transferred is a negative pattern reverse to the positive pattern shown in FIGS. 4A to 4C, the information can be magnetically transferred to the slave medium 2 by reversing the directions of the initial DC magnetic field Hin and the transfer magnetic field Hdu. The intensities of the initial DC magnetic field and the transfer magnetic field are determined on the basis of the coercive force of the slave medium 2, the specific permeabilities of the master information carrier and the slave medium, and the like.

A master information carrier for preformatting perpendicular magnetic recording media in accordance with a second embodiment of the present invention will be described first.

Figure 5:
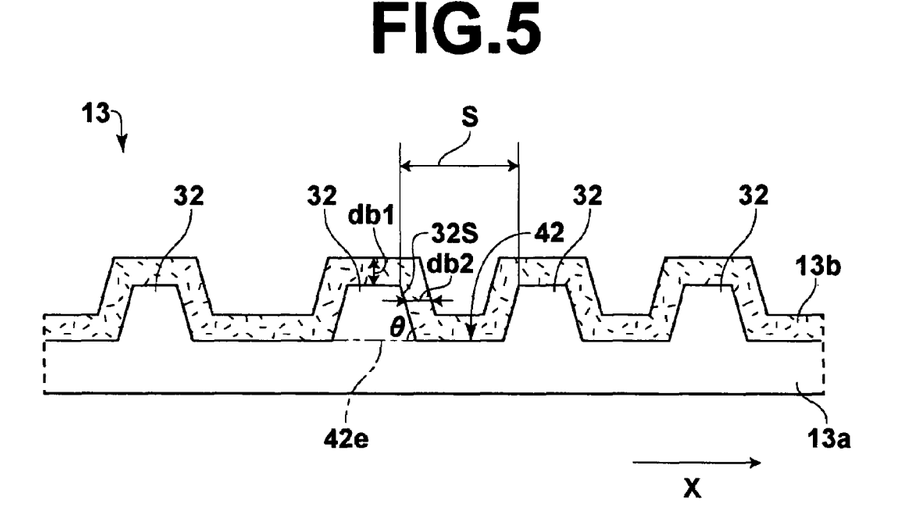
FIG. 5 is a fragmentary cross-sectional view of a part of a master information carrier in accordance with the second embodiment of the present invention.

FIG. 5 is a fragmentary cross-sectional view of a part of a master information carrier 13 in accordance with the second embodiment of the present invention including a protruding portion 32 on a base sheet 13*a* taken along a line parallel to the direction X of track. In FIG. 5, reference numeral 13*b* denotes a soft magnetic layer. In the master information carrier 13 of this embodiment, the soft magnetic layer 13*b* is formed so that the thickness db1 of the soft magnetic layer on the upper surface of the protruding portion 32 and the thickness db2 of the soft magnetic layer on the side surface of the protruding portion 32 satisfy the following condition, $0.1 < db2/db1 \leq 0.5$.

Further, in this embodiment, the angle θ of inclination of each of the side surfaces of the protruding portion 31 of the irregularity pattern (the angle between the protrusion side extension 41*e* of the surface 41 of the recess and the side surface 31*s* of the protruding portion 41) is not smaller than 30° and smaller than 80°. Further, in the embodiment, the ratio of the thickness db2 of the magnetic layer on each of the side surfaces 31*s* of the protruding portion 31 to the length S of the recess is larger than 0.05 and smaller than 0.4, that is, $0.05 < db2/S < 0.4$. In this specification, "the length S of the recess" should be interpreted as "the minimum of the lengths of the recesses between the tops of adjacent protruding portions 31 of the irregularity pattern as measured in the direction of track.

The soft magnetic layer 13*b* may be formed by the same manner as the soft magnetic layer 3*b* in the first embodiment described above.

Figure 6A:
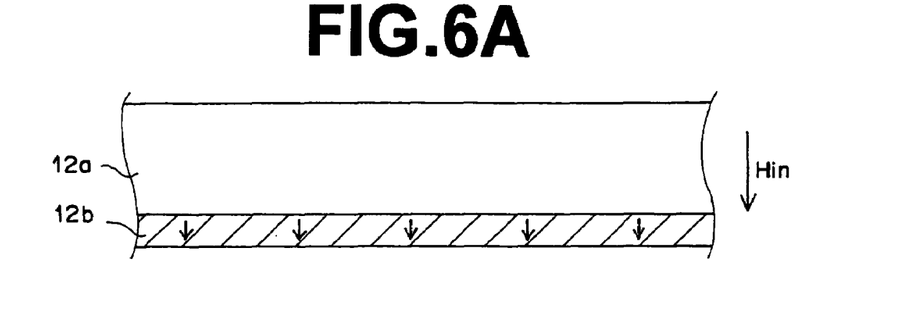
FIGS. 6A to 6C are views for illustrating basic steps of magnetic transfer to a perpendicular magnetic medium.
Figure 6B:
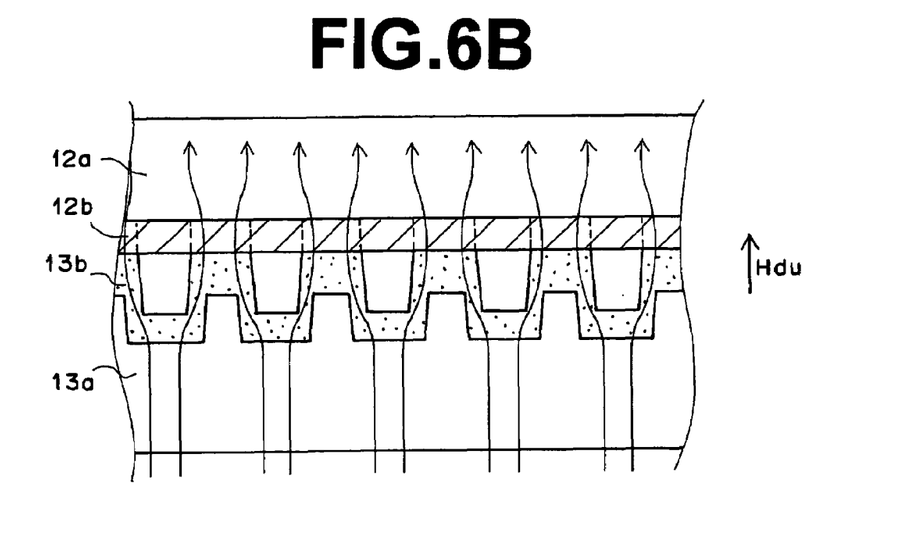
Figure 6C:
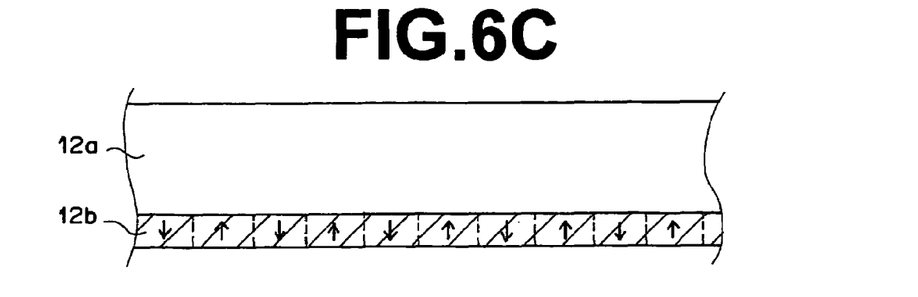

Basic steps of magnetic transfer to a perpendicular magnetic recording medium will be described with reference to FIGS. 6A to 6C, hereinbelow. In FIGS. 6A to 6C, only the lower magnetic layer 12*b* is shown.

An initial DC magnetic field Hin is first applied to the slave medium 2 in one direction perpendicular to the track surface thereof, thereby magnetizing the magnetic layer 12*b* of the slave medium 12 as shown in FIG. 6A. Thereafter, the soft magnetic layer 13*b* of the lower master information carrier 13 is brought into close contact with the lower magnetic layer 12*b* of the slave medium 12. In this state, a transfer magnetic field Hdu is applied in the direction opposite to the initial DC magnetic field Hin as shown in FIG. 6B, thereby magnetically transferring the information on the master information carrier 13 to the lower magnetic layer 12*b* of the slave medium 12. As a result, information represented by the irregularity patterns on the master information carrier 13 is transferred to the lower layer 12*b* as shown in FIG. 6C. The information represented by the irregularity patterns on a pair of master information carriers may be transferred to opposite sides of the slave medium either simultaneously or in sequence.

In the case where the irregularity pattern representing information to be transferred is a negative pattern reverse to the positive pattern shown in FIGS. 6A to 6C, the information can be magnetically transferred to the slave medium 12 by reversing the directions of the initial DC magnetic field Hin and the transfer magnetic field Hdu. The intensities of the initial DC magnetic field and the transfer magnetic field are determined on the basis of the coercive force of the slave medium 12, the specific permeabilities of the master information carrier and the slave medium, and the like.

In the first and second embodiments, a magnetic recording disc such as a hard disc or high-density flexible disc is generally employed as the slave medium 2 or 12. The magnetic layer thereof is generally of a coated magnetic material or a metal film. The magnetic layer of the in-plane magnetic recording medium 2 has a magnetic anisotropy where there is an axis of easy magnetization in a direction parallel to the direction track, whereas the magnetic layer of the perpendicular magnetic recording medium 12 has a magnetic anisotropy where there is an axis of easy magnetization in a direction perpendicular to the track surface.

EXAMPLES

Master information carriers in accordance with first to twenty-second embodiments of the present invention and first to fourth comparative examples were made in the following way and transferred signal quality and durability of the master information carriers were evaluated in the following manner. The result is shown in the following table. In the table, "emb" is "embodiment", "c/e" is an abbreviation of "comparative example", "SQ" is an abbreviation of "transferred signal quality", and "dur" is an abbreviation of "durability".

Evaluation of the Transferred Signal Quality

Quality of the signal reproduced from the slave medium was evaluated by the use of electromagnetic conversion property meter (SS-60: KYODO Electronics). A GMR head which was 0.12 μm in reproducing head gap, 0.41 μm in reproducing track width, 0.2 μm in recording head gap and 0.67 μm in recording track width was employed. The read signal was divided into frequencies by a spectro-analyzer, and the difference C/N between the peak intensity C of the primary signal and the medium noise N obtained by extrapolation was measured. The quality of the signal reproduced from the slave medium was evaluated on the basis of the relative values Δ C/N with the difference C/N between the peak intensity C of the primary signal and the medium noise N obtained from the same slave medium by recording and reproducing the same signal by the use of the same GMR head instead of magnetic transfer taken as 0 db. When the relative value ΔC/N is larger than −1.5 db, the transferred signal quality was evaluated as a good state ○, when the relative value ΔC/N is not smaller than −3.0 db and not smaller than −1.5 db, the transferred signal quality was evaluated as a fair state Δ and when the relative value ΔC/N is smaller than −3.0 db, the transferred signal quality was evaluated as a poor state X.

The durability of the master information carrier was evaluated in the following manner. That is, with the contact pressure between the master information carrier and the slave medium set to 0.49 Mpa (5.0 kgf/cm$^2$), the master information carrier and the slave medium were repeatedly contacted and separated 1000 times. Thereafter, the surface of the master information carrier was observed through differential interference microscope at 480X in 500 random fields of view. Then if the number of worn or cracked portions is tow or less, the durability of the master information carrier was evaluated as good ○, if the number of the same was 3 to 5, it was evaluated as fair Δ and if the number of the same was 6 or more, it was evaluated as poor X.

First Embodiment

Information on a master information carrier was transferred to an in-plane recording slave media. A master information carrier having radial lines which were 1.0 μm in track width and 1.1 μm in track pitch and extended from an innermost position at a distance of 20 mm from the center to an outermost position at a distance of 40 mm from the center was prepared. The bit length was 0.2 μm in the innermost position. The grooves were 0.2 μm in depth that is, the height of the protruding portions was 0.2 μm.

The master information carrier was formed by the use of stamper method, and a soft magnetic layer of FeCO (30 at %) was formed on a Ni base sheet at 25° C. The sputtering pressure was 0.15 Pa (1.08 mTorr), and the power supplied was 2.80 W/cm$^2$.

The in-plane recording slave media were produced in the following manner. That is, 3.5" disc-shaped in-plane magnetic recording media were prepared by a sputtering apparatus (S-50S: Shibaura Mechatronics). The sputtering apparatus, was evacuated to $1.33 \times 10^{-5}$ Pa ($1.0 \times 10^{-7}$ Torr) at the room temperature and then argon was introduced into the apparatus to a pressure of 0.4 Pa (3.0 mTorr). Under these conditions, glass discs were heated to 200° C. and a magnetic layer consisting of a 30 nm thick CrTi layer and a 30 nm thick CoCr layer was formed on each of the glass discs. Each of the slave media was 5.7T (4500 Gauss) in saturation magnetization Ms and 199 kA/m (250Oe) in coercive force. The ratios da2/da1 and da2/S and the angle θ of inclination of each of the side surfaces of the protruding portion of the irregularity pattern were as shown in the following table.

Second Embodiment

The information on the master information carrier were transferred to the slave media in the same manner as in the first embodiment except that da2/da1 was changed to 0.06.

Third Embodiment

The information on the master information carrier were transferred to the slave media in the same manner as in the first embodiment except that da2/da1 was changed to 1.3.

Fourth Embodiment

The information on the master information carrier were transferred to the slave media in the same manner as in the first embodiment except that da2/S was changed to 0.09.

Fifth Embodiment

The information on the master information carrier were transferred to the slave media in the same manner as in the first embodiment except that da2/S was changed to 0.35.

Sixth Embodiment

The information on the master information carrier were transferred to the slave media in the same manner as in the first embodiment except that da2/S was changed to 0.04.

Seventh Embodiment

The information on the master information carrier were transferred to the slave media in the same manner as in the first embodiment except that da2/S was changed to 0.42.

Eighth Embodiment

The information on the master information carrier were transferred to the slave media in the same manner as in the first embodiment except that the angle θ of inclination of each of the side surfaces of the protruding portion was changed to 35°.

Ninth Embodiment

The information on the master information carrier were transferred to the slave media in the same manner as in the first embodiment except that the angle θ of inclination of each of the side surfaces of the protruding portion was changed to 75°.

Tenth Embodiment

The information on the master information carrier were transferred to the slave media in the same manner as in the first embodiment except that the angle θ of inclination of each of the side surfaces of the protruding portion was changed to 25°.

Eleventh Embodiment

The information on the master information carrier were transferred to the slave media in the same manner as in the first embodiment except that the angle θ of inclination of each of the side surfaces of the protruding portion was changed to 85°.

Twelfth Embodiment

Information on a master information carrier was transferred to a perpendicular recording slave media in the same manner as in the first embodiment except that the slave media were formed in the following manner and a perpendicular initial magnetic field and a perpendicular transfer magnetic field were applied to the slave medium and the master information carrier.

The perpendicular recording slave media were produced in the following manner. That is, 3.5" disc-shaped perpendicular magnetic recording media were prepared by a sputtering apparatus (S-50S: Shibaura Mechatronics). The sputtering apparatus was evacuated to $1.33 \times 10^{-5}$ Pa ($1.0 \times 10^{-7}$ Torr) at the room temperature and then argon was introduced into the apparatus to a pressure of 0.4 Pa (3.0 mTorr). Under these conditions, glass discs were heated to 200° C. and a magnetic layer consisting of a 100 nm thick NiFe layer, a 30 nm thick CrTi and 30 nm thick CoCrPt layer was formed on each of the glass disc. Each of the slave media was 5.7T (4500 Gauss) in saturation magnetization Ms and 199 kA/m (250 Oe) in coercive force. The ratios db2/db1 and db2/S and the angle θ of inclination of each of the side surfaces of the protruding portion of the irregularity pattern were as shown in the following table.

Thirteenth Embodiment

The information on the master information carrier were transferred to the slave media in the same manner as in the twelfth embodiment except that db2/da1 was changed to 0.3.

Fourteenth Embodiment

The information on the master information carrier were transferred to the slave media in the same manner as in the twelfth embodiment except that db2/da1 was changed to 0.49.

Fifteenth Embodiment

The information on the master information carrier were transferred to the slave media in the same manner as in the twelfth embodiment except that db2/S was changed to 0.09.

Sixteenth Embodiment

The information on the master information carrier were transferred to the slave media in the same manner as in the twelfth embodiment except that db2/S was changed to 0.35.

Seventeenth Embodiment

The information on the master information carrier were transferred to the slave media in the same manner as in the twelfth embodiment except that db2/S was changed to 0.04.

Eighteenth Embodiment

The information on the master information carrier were transferred to the slave media in the same manner as in the twelfth embodiment except that db2/S was changed to 0.42.

Nineteenth Embodiment

The information on the master information carrier were transferred to the slave media in the same manner as in the twelfth embodiment except that the angle θ of inclination of each of the side surfaces of the protruding portion was changed to 35°.

Twentieth Embodiment

The information on the master information carrier were transferred to the slave media in the same manner as in the twelfth embodiment except that the angle θ of inclination of each of the side surfaces of the protruding portion was changed to 75°.

Twenty-First Embodiment

The information on the master information carrier were transferred to the slave media in the same manner as in the twelfth embodiment except that the angle θ of inclination of each of the side surfaces of the protruding portion was changed to 25°.

Twenty-Second Embodiment

The information on the master information carrier were transferred to the slave media in the same manner as in the twelfth embodiment except that the angle θ of inclination of each of the side surfaces of the protruding portion was changed to 85°.

Comparative Example 1

The information on the master information carrier were transferred to the slave media in the same manner as in the first embodiment except that da2/da1 was changed to 0.04.

Comparative Example 2

The information on the master information carrier were transferred to the slave media in the same manner as in the first embodiment except that da2/da1 was changed to 1.5.

Comparative Example 3

The information on the master information carrier were transferred to the slave media in the same manner as in the twelfth embodiment except that db2/db1 was changed to 0.1.

Comparative Example 4

The information on the master information carrier were transferred to the slave media in the same manner as in the twelfth embodiment except that db2/db1 was changed to 0.7.

TABLE

| | medium | da2/da1 (db2/db1) | da2/S (db2/S) | θ (°) | SQ (dB) | dur |
|---|---|---|---|---|---|---|
| emb. 1 | in-plane | 0.5 | 0.2 | 45 | +0.1 (○) | 0 (○) |
| emb. 2 | in-plane | 0.06 | 0.2 | 45 | 0.0 (○) | 1 (○) |
| emb. 3 | in-plane | 1.3 | 0.2 | 45 | −0.7 (○) | 0 (○) |
| emb. 4 | in-plane | 0.5 | 0.09 | 45 | −0.9 (○) | 1 (○) |
| emb. 5 | in-plane | 0.5 | 0.35 | 45 | −0.4 (○) | 2 (○) |
| emb. 6 | in-plane | 0.5 | 0.04 | 45 | −1.8 (△) | 2 (○) |
| emb. 7 | in-plane | 0.5 | 0.42 | 45 | −1.9 (△) | 2 (○) |
| emb. 8 | in-plane | 0.5 | 0.2 | 35 | −1.4 (○) | 1 (○) |
| emb. 9 | in-plane | 0.5 | 0.2 | 75 | −0.4 (○) | 1 (○) |
| emb. 10 | in-plane | 0.5 | 0.2 | 25 | −2.7 (△) | 2 (○) |
| emb. 11 | in-plane | 0.5 | 0.2 | 85 | +0.2 (○) | 5 (△) |
| emb. 12 | perpendicular | 0.11 | 0.2 | 45 | +0.5 (○) | 2 (○) |
| emb. 13 | perpendicular | 0.3 | 0.2 | 45 | −0.1 (○) | 2 (○) |
| emb. 14 | perpendicular | 0.49 | 0.2 | 45 | −0.2 (○) | 1 (○) |
| emb. 15 | perpendicular | 0.11 | 0.09 | 45 | −0.7 (○) | 1 (○) |
| emb. 16 | perpendicular | 0.11 | 0.35 | 45 | +0.1 (○) | 1 (○) |
| emb. 17 | perpendicular | 0.11 | 0.04 | 45 | −2.1 (△) | 2 (○) |
| emb. 18 | perpendicular | 0.11 | 0.42 | 45 | −2.9 (△) | 1 (○) |
| emb. 19 | perpendicular | 0.11 | 0.2 | 35 | −0.5 (○) | 0 (○) |
| emb. 20 | perpendicular | 0.11 | 0.2 | 75 | +0.2 (○) | 0 (○) |
| emb. 21 | perpendicular | 0.11 | 0.2 | 25 | −3.0 (△) | 2 (○) |
| emb. 22 | perpendicular | 0.11 | 0.2 | 85 | +0.8 (○) | 4 (○) |
| c/e. 1 | in-plane | 0.04 | 0.2 | 45 | −1.8 (○) | 7 (X) |
| c/e. 2 | in-plane | 1.5 | 0.2 | 45 | −2.3 (X) | 1 (○) |
| c/e. 3 | perpendicular | 0.1 | 0.2 | 45 | −0.5 (○) | 10 (X) |
| c/e. 4 | perpendicular | 0.7 | 0.2 | 45 | −3.5 (X) | 0 (○) |

What is claimed is:

1. A master information carrier for magnetic transfer to an in-plane magnetic recording medium, said master information carrier comprising a base sheet having an irregularity pattern representing information to be transferred to said in-plane magnetic recording medium and a magnetic layer formed along the irregularity pattern, wherein the master information carrier has a thickness da1 of the magnetic layer on an upper surface of a protruding portion of the irregularity pattern and a thickness da2 of the magnetic layer on each of side surfaces of the protruding portion, said thickness da1 and said thickness da2 satisfying the following condition:

$0.05 < da2/da1 \leq 1.3.$

2. A master information carrier as defined in claim 1 in which the ratio of the thickness da2 of the magnetic layer on each of the side surfaces of the protruding portion to the length S of the flat portion of a recess is larger than 0.05 and smaller than 0.4.

3. A master information carrier as defined in claim 1 in which the angle θ of inclination of each of the side surfaces of the protruding portion of the irregularity pattern is not smaller than 30° and smaller than 80°.

4. A master information carrier as defined in claim 1 in which the information to be transferred includes a servo signal.

5. A master information carrier as defined in claim 1 in which the magnetic layer is a soft magnetic layer or a semi-hard magnetic layer.

6. A master information carrier for magnetic transfer to a perpendicular magnetic recording medium, said master information carrier comprising a base sheet having an irregularity pattern representing information to be transferred to a perpendicular magnetic recording medium and a magnetic layer formed along the irregularity pattern, wherein the master information carrier has a thickness db1 of the magnetic layer on an upper surface of a protruding portion of the irregularity pattern and a thickness db2 of the magnetic layer on each of side surfaces of the protruding portion, said thickenss db1 and said thickenss db2 satisfying the following condition, $0.1 < db2/db1 \leq 0.5.$

7. A master information carrier as defined in claim 6 in which the ratio of the thickness db2 of the magnetic layer on each of the side surfaces of the protruding portion to the length S of the recess is larger than 0.05 and smaller than 0.4.

8. A master information carrier as defined in claim 6 in which the angle θ of inclination of each of the side surfaces of the protruding portion of the irregularity pattern is not smaller than 30° and smaller than 80°.

9. A master information carrier as defined in claim 6 in which the information to be transferred includes a servo signal.

10. A master information carrier as defined in claim 6 in which the magnetic layer is a soft magnetic layer or a semi-hard magnetic layer.

* * * * *